US010802791B2

(12) United States Patent
Patil et al.

(10) Patent No.: US 10,802,791 B2
(45) Date of Patent: Oct. 13, 2020

(54) METHODS AND SYSTEMS FOR STREAMING AUDIO AND VOICE DATA

(71) Applicant: Bose Corporation, Framingham, MA (US)

(72) Inventors: Naganagouda B. Patil, Ashland, MA (US); Nathan Blagrove, Wayland, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/290,408

(22) Filed: Mar. 1, 2019

(65) Prior Publication Data

US 2020/0278826 A1 Sep. 3, 2020

(51) Int. Cl.
*G06F 17/00* (2019.01)
*G06F 3/16* (2006.01)
*H04M 1/725* (2006.01)
*H04W 4/80* (2018.01)

(52) U.S. Cl.
CPC .......... *G06F 3/165* (2013.01); *H04M 1/7253* (2013.01); *H04W 4/80* (2018.02)

(58) Field of Classification Search
CPC ........ G06F 3/165; H04W 4/80; H04M 1/7253
See application file for complete search history.

(56) References Cited

U.S. PATENT DOCUMENTS

| 2010/0273417 | A1 | 10/2010 | Tian et al. |
| 2014/0188483 | A1 | 7/2014 | Hisada |
| 2015/0223272 | A1* | 8/2015 | Parkinson ........... G10L 19/0017 455/41.2 |
| 2018/0167715 | A1* | 6/2018 | Graylin ................ H04R 1/1083 |
| 2019/0159001 | A1* | 5/2019 | Wang ....................... H04R 1/08 |
| 2019/0182649 | A1* | 6/2019 | Best ........................ H04W 4/80 |

FOREIGN PATENT DOCUMENTS

EP 3242491 A1 11/2017

OTHER PUBLICATIONS

Invitation to Pay Additional Fees and, Where Applicable, Protest Fee, International Application No. PCT/US2020/019879, pp. 1-10, dated May 26, 2020.

(Continued)

*Primary Examiner* — Joseph Saunders, Jr.
(74) *Attorney, Agent, or Firm* — Bond, Schoeneck & King, PLLC

(57) ABSTRACT

Methods and systems for streaming audio and voice data, the method including: providing a first wearable audio device having a first speaker and a first communication module; establishing, via circuitry of a first device, a first connection over a first protocol between the first wearable audio device and the first device; receiving, via an audio-oriented profile or channel of the first protocol, a first audio stream from the first device over a first time interval; receiving, via a first microphone of the first wearable audio device, a first voice input during the first time interval; and, sending, via a data-oriented profile or channel of the first protocol, the first voice input to the first device during the first time interval.

20 Claims, 9 Drawing Sheets

(56) References Cited

OTHER PUBLICATIONS

Anonymous: "Bluetooth Basics—learn.sparkfun.com", Oct. 18, 2015 (Oct. 18, 2015), XP055388746, Retrieved from the Internet: URL: https://web.archive.org/web/20151018112633/http://learn.sparkfun.com/tutorials/bluetooth-basics/all retrieved on Jul. 6, 2017] p. 6 section A/V Remote Control Profile (AVRCP).

Anonymous: "iPhone OS version history", Internet Citation, Jun. 29, 2007 (Jun. 29, 2007), pp. 1-20, KP002561564, Retrieved from the Internet: URL: http://en.wikipedia.org/wiki/lPhone_OS_version_history [retrieved on Dec. 22, 2009] p. 16, 7th bullet point from bottom of page.

International Search Report and the Written Opinion of the International Searching Authority, International Application No. PCT/US2020/019879, pp. 1-21, dated Aug. 6, 2020.

\* cited by examiner

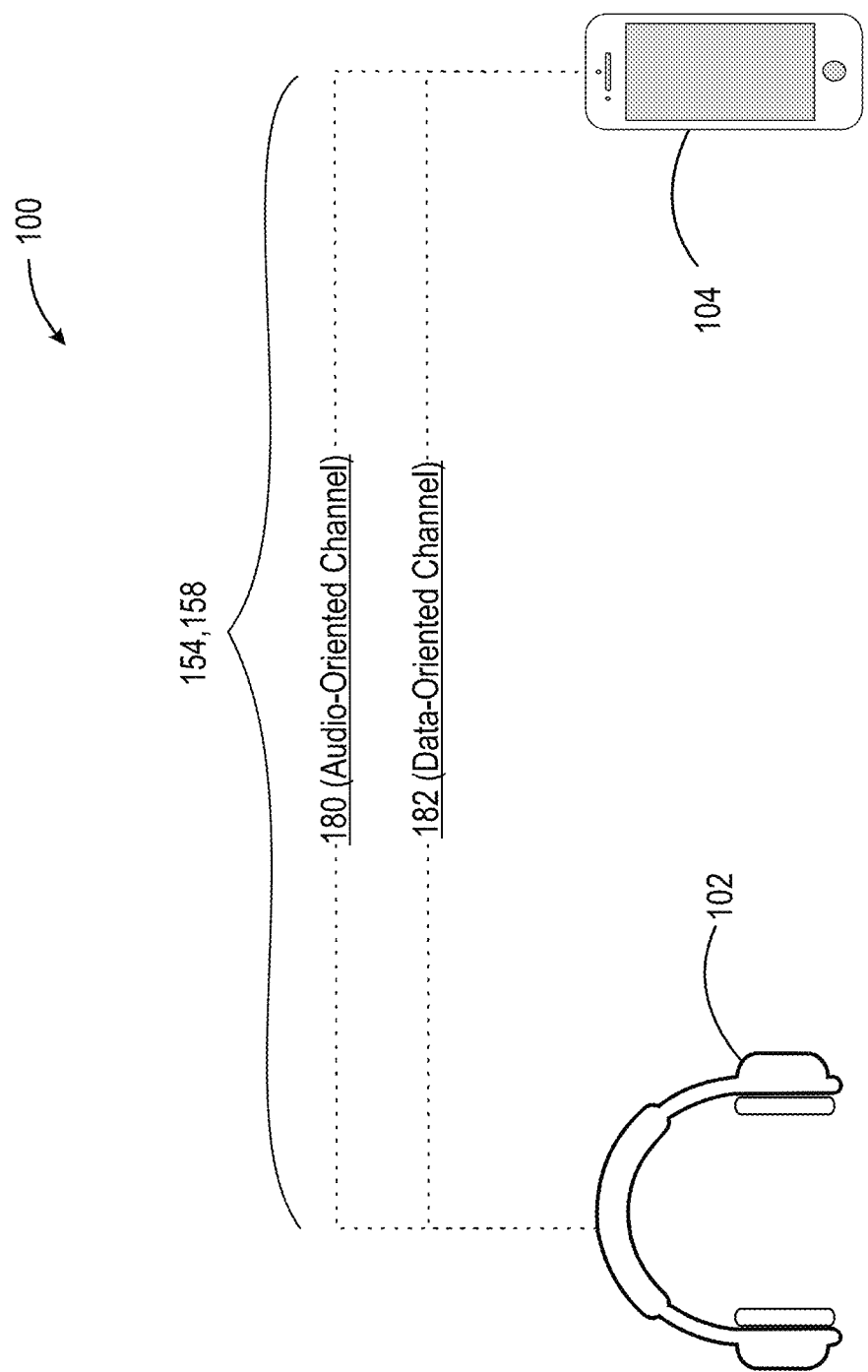

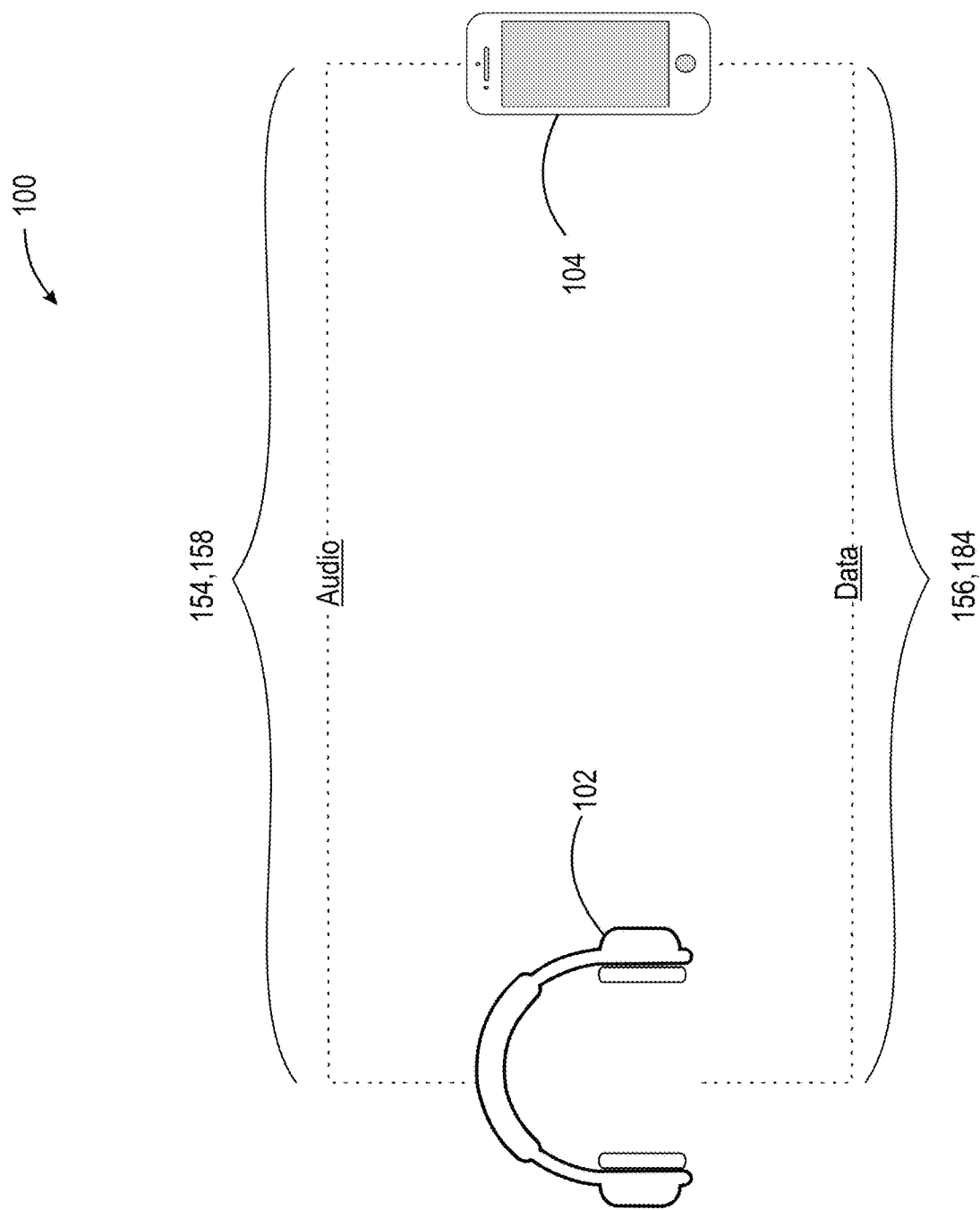

METHODS AND SYSTEMS FOR STREAMING AUDIO AND VOICE DATA

BACKGROUND

The present disclosure relates to methods and systems for streaming audio and voice data between devices, specifically wireless systems which send and receive audio and voice.

SUMMARY OF THE DISCLOSURE

The present disclosure relates to methods and systems for sending audio and voice data between two devices, e.g., a first wearable device and a first device, simultaneously. The methods and systems can utilize different wireless protocols, the same wireless protocol and different channels within that protocol, and/or the same wireless protocol and different wireless profiles within that protocol.

In one aspect, there is provided a method for streaming audio and voice data, the method including: providing a first wearable audio device having a first speaker and a first communication module; establishing, via circuitry of a first device, a first connection over a first protocol between the first wearable audio device and the first device; receiving, via an audio-oriented profile or channel of the first protocol, a first audio stream from the first device over a first time interval; receiving, via a first microphone of the first wearable audio device, a first voice input during the first time interval; and, sending, via a data-oriented profile or channel of the first protocol, the first voice input to the first device during the first time interval.

In one aspect, the audio-oriented profile or channel comprises a high-throughput connection.

In one aspect, the data-oriented profile or channel comprises a high throughput connection.

In one aspect, the audio-oriented profile or channel comprises the Advanced Audio Distribution Profile (A2DP) in Bluetooth Classic or Bluetooth Low-Energy (BLE).

In one aspect, the data-oriented profile or channel comprises at least one of: Serial Port Profile (SPP), iPod Accessory Protocol (iAP), Radio Frequency Communication (RFCOMM), a connection-oriented channel (CoC), Bluetooth Generic Attribute Profile (GATT), and Logical Link Control and Adaptation Protocol (L2CAP).

In one aspect, the first protocol comprises Bluetooth Classic or Bluetooth Low-Energy (BLE).

In one aspect, the sending the first voice input to the first device include: encoding the first voice input received by the first microphone over the first time interval; sending an encoded voice input from the first wearable audio device to the first device during the first time interval; and, decoding, using the first device, the encoded voice into a decoded voice input during the first time interval.

In one aspect, the decoded voice input is utilized by a third-party program running on the first device during a second time interval after the first time interval, and the third-party program provides an audio playback during a third time interval after the second time interval.

In one aspect, the first audio stream is received, and a first audio signal is produced by the first speaker during the first time interval, the second time interval, and the third time interval.

In one aspect, there is provided a method for streaming audio and voice data, the method including: providing a first wearable audio device having a first speaker and a first communication module; establishing, via circuitry of a first device, a first connection over a first protocol and a second connection over a second protocol between the first wearable audio device and the first device; receiving, via the first protocol, a first audio stream from the first device over a first time interval; receiving, via a first microphone of the first wearable audio device, a first voice input during the first time interval; and, sending, via the second protocol, the first voice input to the first device during the first time interval.

In one aspect, the first protocol comprises Bluetooth Classic.

In one aspect, the first audio stream is received over the Advanced Audio Distribution Profile (A2DP) of Bluetooth Classic or a profile or channel of Bluetooth Low-Energy.

In one aspect, the second protocol comprises Bluetooth Low-Energy (BLE) or Bluetooth Classic.

In one aspect, the first voice input is sent over at least one of: Serial Port Profile (SPP), iPod Accessory Protocol (iAP), Radio Frequency Communication (RFCOMM), a connection-oriented channel (CoC), Bluetooth Generic Attribute Profile (GATT), and Logical Link Control and Adaptation Protocol (L2CAP).

In one aspect, the sending the first voice input to the first device includes: encoding the first voice input received by the first microphone over the first time interval; sending an encoded voice input from the first wearable audio device to the first device during the first time interval; and, decoding, using the first device, the encoded voice into a decoded voice input during the first time interval.

In one aspect, the decoded voice input is utilized by a third-party program running on the first device during a second time interval after the first time interval, and the third-party program provides an audio playback during a third time interval after the second time interval.

In one aspect, the first audio stream is received, and a first audio signal is produced by the first speaker during the first time interval, the second time interval, and the third time interval.

In one aspect, an audio system is provided, the system including a first wearable audio device and a first device, the first wearable audio device including a first speaker and, a first communication module arranged to establish a first connection with a first device via a first protocol wherein the first wearable audio device is arranged to: receive, over an audio-oriented profile or channel of the first protocol, a first audio stream from the first device over a first time interval; receive, via a first microphone of the first wearable audio device or the first device, a first voice input during the first time interval; and, send, over a data-oriented profile or channel of the first protocol, the first voice input during the first time interval.

In one aspect, the sending the first voice input to the first device comprises, encoding the first voice input received by the first microphone over the first time interval; sending an encoded voice input from the first wearable audio device to the first device during the first time interval; and, decoding, using the first device, the encoded voice into a decoded voice input during the first time interval.

In one aspect, the decoded voice input is utilized by a third-party program running on the first device during a second time interval after the first time interval, and the third-party program provides an audio playback during a third time interval after the second time interval.

In one aspect, the first audio stream is received, and a first audio signal associated with the first audio stream is produced by the first speaker during the first time interval, the second time interval, and the third time interval.

In one aspect, an audio system is provided, the audio system including a first wearable audio device having a first speaker and a first communication module arranged to establish a first connection with a first device via a first protocol and a second connection with the first device via a second protocol; wherein the first wearable audio device is arranged to: receive, over a first protocol, a first audio stream from the first device over a first time interval; receive, via a first microphone of the first wearable audio device or the first device, a first voice input during the first time interval; and, send, over a second protocol, the first voice input during the first time interval.

In one aspect, the sending the first voice input to the first device including: encoding the first voice input received by the first microphone over the first time interval; sending an encoded voice input from the first wearable audio device to the first device during the first time interval; and, decoding, using the first device, the encoded voice into a decoded voice input during the first time interval.

In one aspect, the decoded voice input is utilized by a third-party program running on the first device during a second time interval after the first time interval.

In one aspect, the third-party program provides an audio playback during a third time interval after the second time interval, and the first audio stream is received, and a first audio signal associated with the first audio stream is produced by the first speaker during the first time interval, the second time interval, and the third time interval.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 5B is a schematic representation of an audio system according to the present disclosure.

FIG. 5C is a schematic representation of an audio system according to the present disclosure.

DETAILED DESCRIPTION OF EMBODIMENTS

The present disclosure relates to methods and systems for sending audio and voice data between two devices, e.g., a first wearable device and a first device, simultaneously. The methods and systems can utilize different wireless protocols, the same wireless protocol and different channels within that protocol, and/or the same wireless protocol and different wireless profiles within that protocol.

Figure 1:
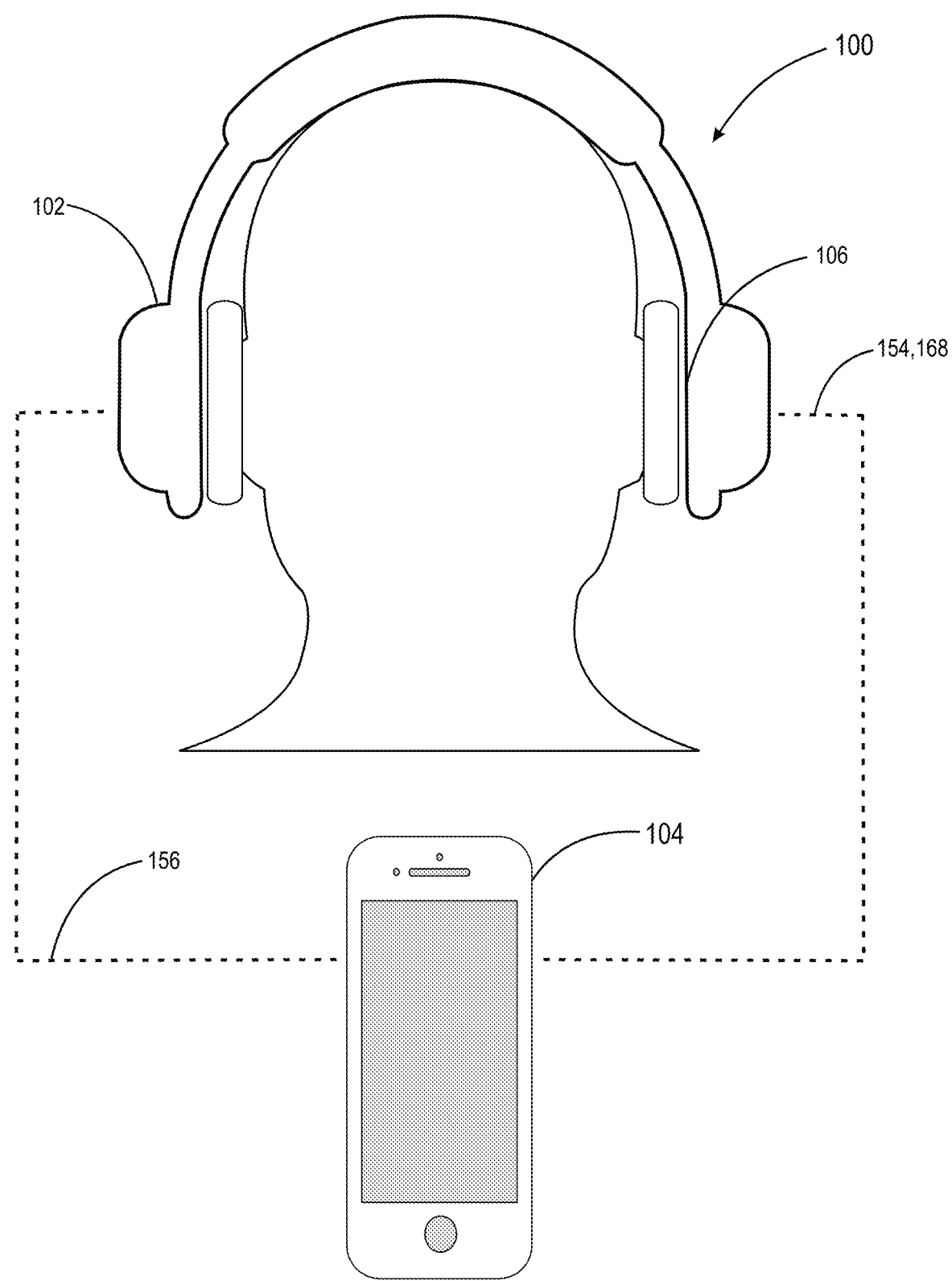
FIG. 1 is a schematic view of an audio system according to the present disclosure.
Figure 2:
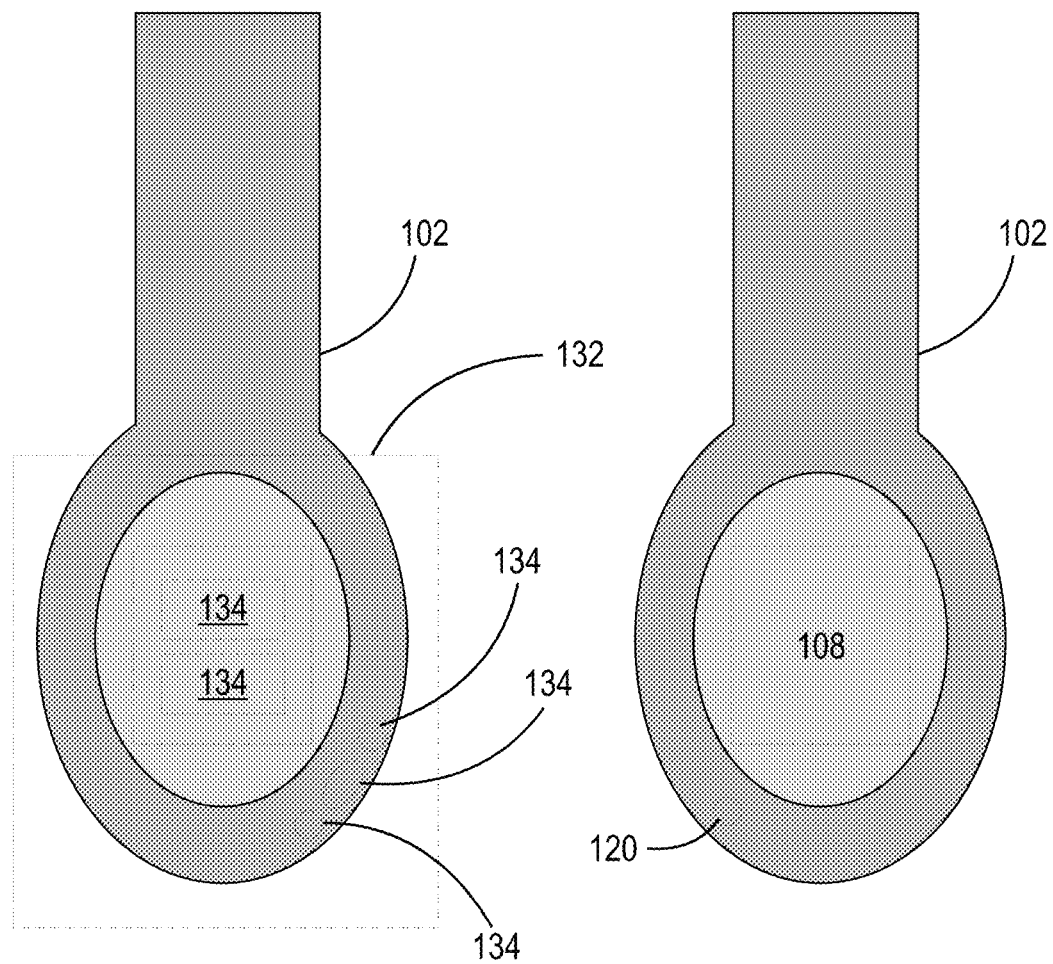
FIG. 2A is a right-side schematic view of a first wearable audio device according to the present disclosure.
FIG. 2B is a right-side schematic view of a first wearable audio device according to the present disclosure.

The term "wearable audio device", as used in this application, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver may be housed in an earcup. While some of the figures and descriptions following may show a single wearable audio device, having a pair of earcups (each including an acoustic driver) it should be appreciated that a wearable audio device may be a single stand-alone unit having only one earcup. Each earcup of the wearable audio device may be connected mechanically to another earcup or headphone, for example by a headband and/or by leads that conduct audio signals to an acoustic driver in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset. While FIG. 1 shows an example of an around-ear headset, in other examples the headset may be an in-ear, on-ear, or near-ear headset. In some examples, a wearable audio device may be an open-ear device that includes an acoustic driver to radiate acoustic energy towards the ear while leaving the ear open to its environment and surroundings.

The following description should be read in view of FIGS. 1-4. FIG. 1 is a schematic view of audio system 100 according to the present disclosure. Audio system 100 includes a first wearable audio device 102 and first device 104 discussed below. Although illustrated in FIG. 1 as a pair of over-ear headphones, it should be appreciated that first wireless audio device 102 could be any type of headphone or wearable device capable of establishing a wireless or wired data connection with first device 104.

First wearable audio device 102 includes first speaker 106 and first communication module 108 (shown in FIGS. 2B and 3A). First speaker 106 (also shown in 2A) is arranged to produce first audio signal 110 (not shown) proximate at least one ear of a user in response to audio data of first audio stream 168, discussed below, which is sent and/or received from first communication module 108. First audio signal 110 can have a first volume V1 (not shown). First communication module 108 is arranged to send and/or receive data via an antenna, e.g., first antenna 112 as shown in FIG. 3A. The data sent and/or received can be, e.g., audio data from first audio stream 168 (discussed below) or data relating to voice input 122 (discussed below) sent and/or received from a plurality of external devices, e.g., first device 104. It should be appreciated, that first communication module 108 can be operatively connected to processor 114 (shown in FIG. 3A) and first memory 116 (shown in FIG. 3A) operatively arranged to execute and store a first set of non-transitory computer-readable instructions 118 (shown in FIG. 3A), as well as a battery or other power source (not shown).

Furthermore, first wearable audio device 102 includes first microphone 120 arranged to receive a first voice input 122 (shown in FIG. 4A) from a user. As will be discussed below in the operation of system 100, first microphone 120 can be in an active state 124 (not shown) or an inactive state 126 (not shown). When in active state 124, first microphone 120 is arranged to receive first voice input 122 and provide first voice input 122 to first communication module 108. Additionally, first wearable audio device 102 further includes a first sensor 128 (shown in FIG. 4A) arranged on or within first wearable audio device 102. First sensor 128 can be selected from: a gyroscope, an accelerometer, a magnetometer, or any other sensor capable of determining the position, angular velocity, orientation, acceleration, or direction of first wearable audio device 102 with respect to a magnetic force of first wearable audio device 102.

Additionally, in one example, first sensor 128 can be a Voice Activity Detection (VAD) sensor arranged to detect the presence or absence of human speech of a user. First sensor 128 is arranged to obtain sensor data 130 (schematically shown in FIG. 4A) and relay sensor data 130 to first communication module 108. First sensor 128 can be utilized to switch first microphone 120 (or second microphone 152 of first device 104, discussed below) from an inactive state 126 (not receiving and/or recording a voice input, i.e., first voice input 122) to an active state 124 capable of receiving and/or transmitting first voice input 122 to, e.g., first memory 116 of first wearable audio device 102. For example, if first sensor 128 detects motion of a user's jaw or head that would indicate that the user is speaking, first sensor 128 is arranged to communicate with first communication module 108 to switch first microphone 120 from a default inactive state 126 to an active state 124 capable of receiving and transmitting first voice input 122 to, e.g., first memory 116 so that it may subsequently be utilized by system 100 over the various connections described below. It should be appreciated that first microphone 120 or second microphone 152 (shown in FIGS. 3 and 4B) can be utilized to obtain first voice input 122. It should further be appreciated that in the alternative to utilizing first sensor 128 to initiate a switch from inactive state 126 to active state 124, first wearable audio device 102 may utilize first input 134 (discussed below) of first wearable audio device 102 or second input 144 (discussed below) of first device 104 to initiate a switch of first microphone 120 or second microphone 152 from inactive state 126 to active state 124. In some examples, first microphone 150 or second microphone 152 can be in an "always on" or always active state.

As shown in FIGS. 2A-2B, first wearable audio device 102 further includes a first user interface 132 having at least one user input 134. It should be appreciated that, although illustrated in FIG. 2A as a plurality of touch capacitive sensors or a series of buttons or slideable switches, first user interface 132 and user input(s) 134 can take any form capable of receiving an input from a user. Additionally, although not discussed in detail, at least one user input 134 can be a signal generated by sensor 128 such that a motion or a gesture made by the user can serve as an input to first wearable audio device 102. FIGS. 2A-2B illustrate a right-side schematic view and a left-side schematic view, respectively, of first wearable audio device 102 having user first interface 132 and first input(s) 134. It should be appreciated that first interface 132 and first user input(s) 134 can be arranged on the right side or left side of first wearable audio device 102 in any order, pattern, or placement, and any conceivable combination thereof.

Figure 3:
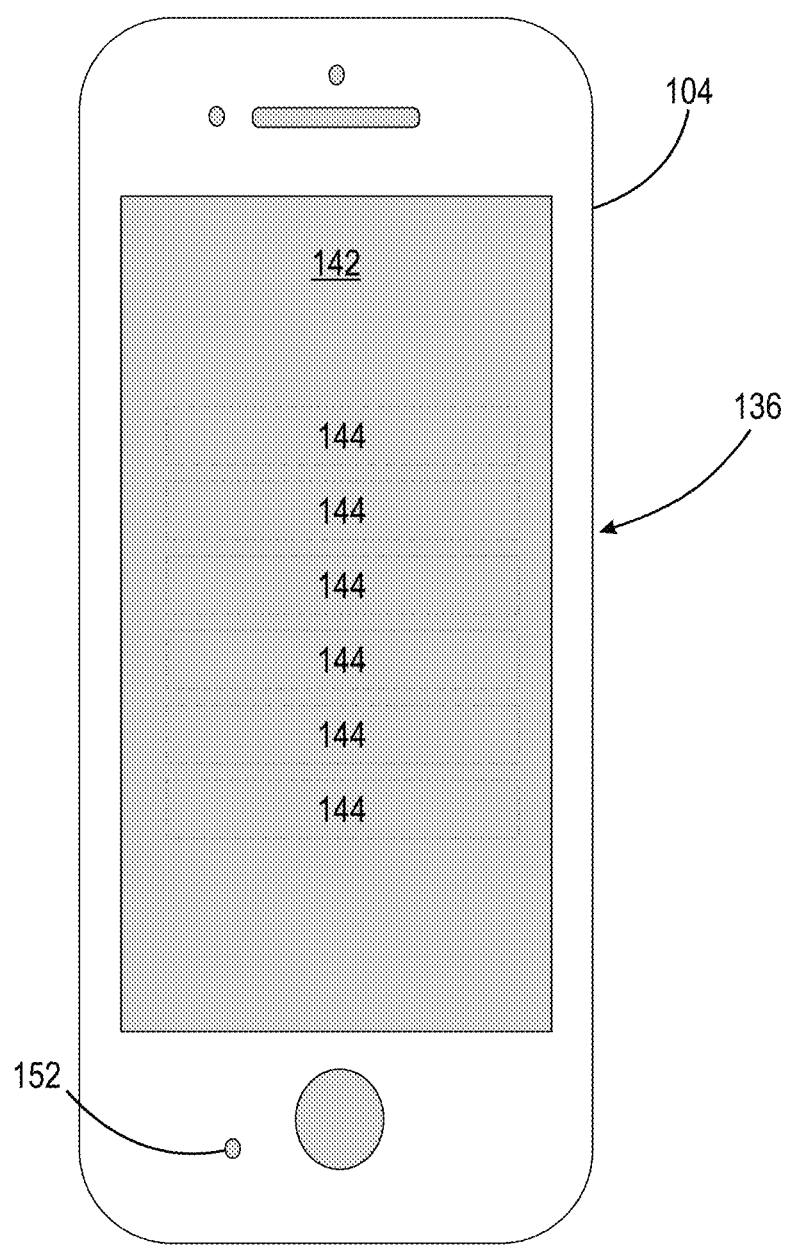
FIG. 3 is a front schematic view of a first device according to the present disclosure.

FIG. 3 illustrates a front schematic view of first device 104. First device 104 according to the present disclosure. First device 104 includes circuitry 136 which can include second communication module 138 (shown in FIG. 4B) arranged to send and/or received data, e.g., audio data related to first audio stream 168 or data related to first voice input 122, via a second antenna 140 (shown in FIG. 4B). First device 104 further includes second user interface 142 having at least one second input 144, and second processor 146 (shown in FIG. 4B) and second memory 148 (shown in FIG. 4B) arranged to execute and store a second set of non-transitory computer-readable instructions 150 (shown in FIG. 4B). Furthermore, although not discussed in detail, second input 144 can be a signal generated by inertial sensors located on or within first device 104, e.g., an accelerometer, a gyroscope, and/or a magnetometer, such that a motion or a gesture made by the user can serve as an input for first device 104. Additionally, first device 104 can include a microphone, i.e., second microphone 152 arranged to receive first voice input 122.

As discussed below, during operation of audio system 100, first communication module 108 of first wearable audio device 102 and second communication module 138 of first device 104 are arranged to establish a simultaneous bi-directional communication to send voice data and audio data between first wearable audio device 102 and first device 104.

The following description should be read in view of FIGS. 1-5C. In one example, first wearable audio device 102 and/or first device 104, via first communication module 108 and second communication module 138, are arranged to establish a first connection, i.e., first connection 154. For example, first antenna 112 of first communication module 108 may initiate/request a first connection 154 with first device 104 where the request is received and accepted via second antenna 140 of second communication module 138. Conversely, second antenna 140 of second communication module 138 may initiate/request first connection 154 with first wearable audio device 102 where the request is received and accepted via first antenna 112 of first communication module 108. In one example, first connection 154 is a wireless connection established between first communication module 108 and second communication module 138 using a wireless protocol, i.e., first protocol 158. It should be appreciated that first protocol 158 can be selected from: a Bluetooth Classic protocol (i.e., Bluetooth Basic Rate/Enhanced Data Rate (BR/EDR)), a Bluetooth Low-Energy (BLE) protocol, a ZigBee protocol, a Wi-Fi (IEEE 802.11) protocol, Near-field Magnetic Induction (NFMI), Near-Field Electromagnetic Induction (NFEMI), or any other protocol for establishing a wireless connection between first wearable audio device 102 and first device 104.

Figure 5A:
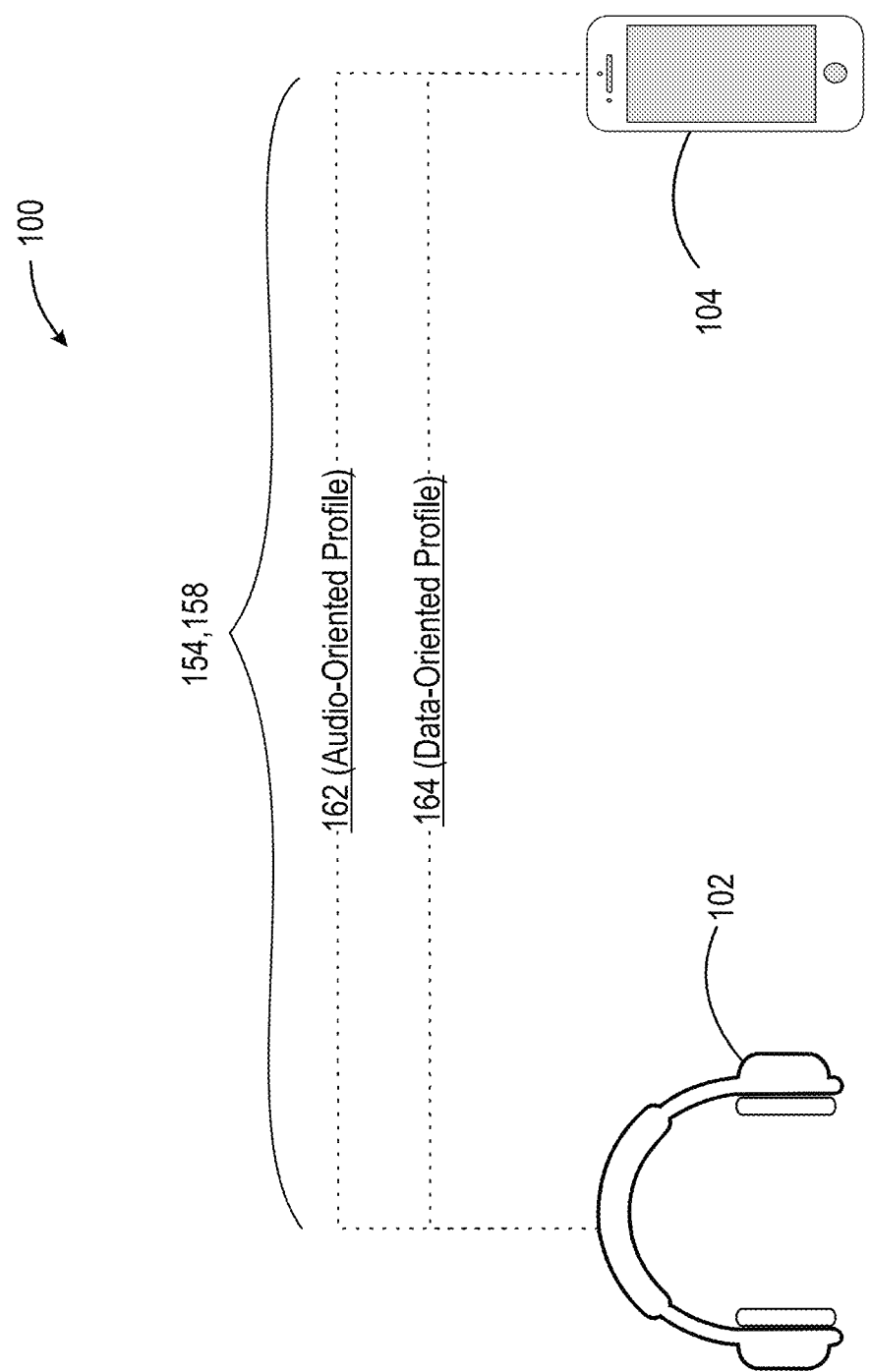
FIG. 5A is a schematic representation of an audio system according to the present disclosure.

As shown in FIG. 5A, in one example, first protocol 158 can include an audio-oriented profile 162 and a data-oriented profile 164. Audio-oriented profile 162 and data-oriented profile 164 can be selected from: Advanced Audio Distribution Profile (A2DP), Attribute Profile (ATT), Audio/Video Remote Control Profile (AVRCP), Basic Imaging Profile (BIP), Basic Printing Profile (BPP), Common ISDN Access Profile (CIP), Cordless Telephony Profile (CTP), Device ID Profile (DIP), Dial-up Networking Profile (DUN), Fax Profile (FAX), File Transfer Profile (FTP), Generic Audio/Video Distribution Profile (GAVDP), Generic Access Profile (GAP), Generic Attribute Profile (GATT), Generic Object Exchange Profile (GOEP), Hard Copy Cable Replacement Profile (HCRP), Health Device Profile (HDP), Hands-Free Profile (HFP), Human Interface Device Profile (HID), Headset Profile (HSP), Intercom Profile (ICP), LAN Access Profile (LAP), Mesh Profile (MESH), Message Access Profile (MAP), OBject EXchange (OBEX), Object Push Profile (OPP), Personal Area Networking Profile (PAN), Phone Book Access Profile (PBAP, PBA), Proximity Profile (PXP), Serial Port Profile (SPP), Service Discovery Application Profile (SDAP), SIM Access Profile (SAP, SIM, rSAP), Synchronization Profile (SYNCH), Synchronization Markup Language Profile (SyncML), Video Distribution Profile (VDP), Wireless Application Protocol Bearer (WAPB), iAP (similar to SPP but only compatible with iOS), or any suitable Bluetooth Classic profile or Bluetooth Low-Energy profile.

In one example, first connection 154 is a high throughput connection, i.e., capable of transmitting larger amounts of data (e.g., 2-3 Mbps). In this example, first protocol 158 is Bluetooth Classic, audio-oriented profile 162 is the Advanced Audio Distribution Profile (A2DP), and data-oriented profile 164 is Serial Port Profile (SPP). During a first time interval, i.e., first time interval 166 (not shown), first wearable audio device 102 and first device 104 are arranged to establish first connection 154 using first protocol 158. Audio-oriented profile 162 of first protocol 158 is arranged to carry or transmit data related to a first audio stream, i.e., first audio stream 168. First audio stream 168 can be audio information related to a digital music file or any other audio file saved in first memory 116, second memory 148, the memory of another external device, or a memory accessible via a network connection (e.g., cloud-based connection). First wearable audio device is arranged to produce first audio signal 110 (not shown) corresponding with first audio stream 168 via first speaker 106. Additionally, and during first time interval 166, data-oriented profile 164 of first protocol 158 is arranged to carry or transmit data related to first voice input 122 received from either first microphone 120 or second microphone 152 while in active state 124 as discussed above. First communication module 108 is arranged to compress and/or encode first voice input 122 so that it can be sent over data-oriented profile 164 of first protocol 158. Optionally, in addition to compressing and/or encoding first voice input 122, first communication module 108 is arranged to execute an audio filter program, i.e., filter 160 (Shown in FIG. 4B), on first voice input 122, where filter 160 (which may comprise one or more filters) is arranged to remove any background audio or background noise unintentionally received by first microphone 106 (or second microphone 152) while receiving first voice input 122. Second communication module 138 is arranged to receive, via data-oriented profile 164 of first protocol 158, the compressed and/or encoded first voice input 122 and decompress and/or decode first voice input 122. Once decompressed and/or decoded by second communication module 138, first voice input 122 can be utilized by a third-party program, e.g., third-party program 170 (not shown). Third-party program 170 is intended to be a program executable on first device 104, which can utilize first voice input 122, e.g., a Virtual Personal Assistant (VPA) program (e.g., Amazon Alexa, Google Assistant, Apple Siri) known in the art.

Figures 4A, 4B:
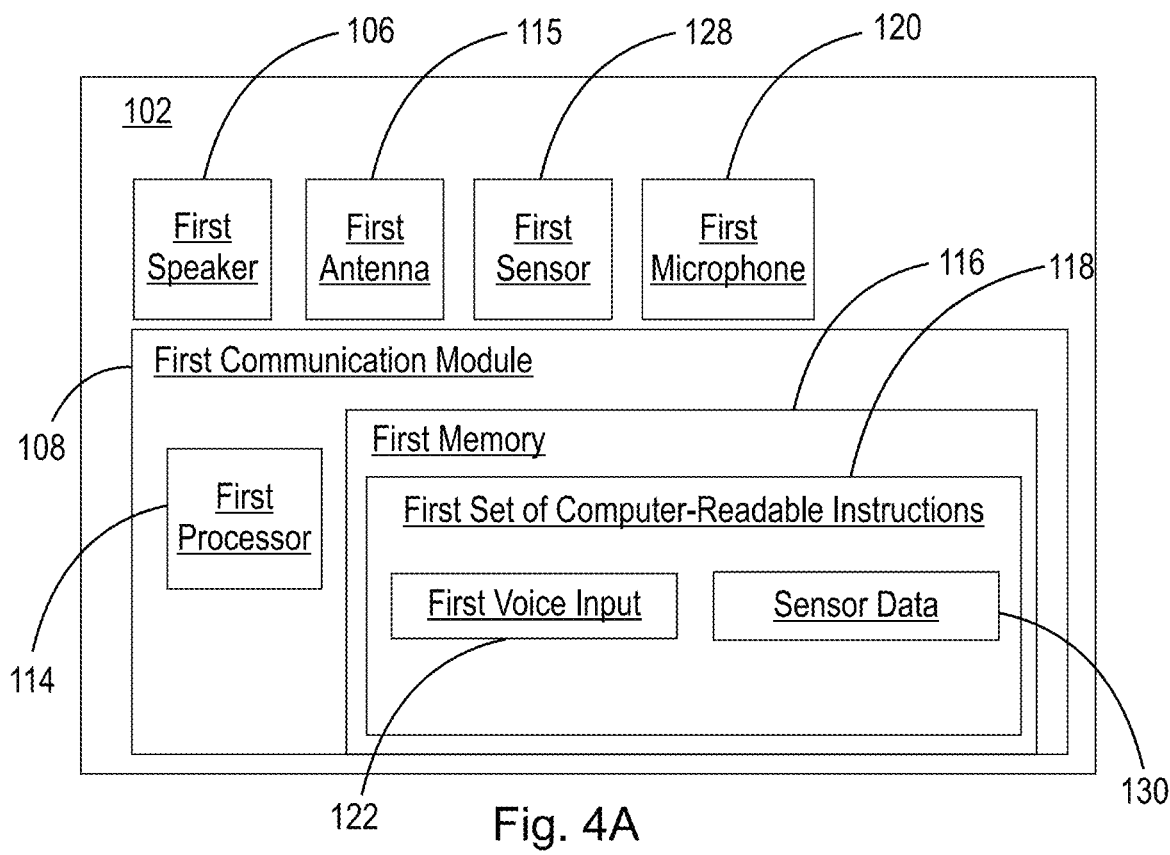
FIG. 4A is a schematic representation of the internal electronic components of a first wearable audio device according to the present disclosure.
FIG. 4B is a schematic representation of the internal electronic components of a first device according to the present disclosure.

During a second time interval, i.e., second time interval 172 (not shown) after first time interval 166, third-party program 170 is arranged to receive first voice input 122 and, e.g., generate an audio playback response corresponding or relating to first voice input 122, i.e., audio playback 174 (shown in FIG. 4B). During a third time interval 176 (not shown), after second time interval 172, audio playback 174 is transmitted, via data-oriented profile 164, from first device 104 to first wearable device 102, where first speaker 106 is arranged to produce a second audio signal, i.e., second audio signal 178 (not shown), where second audio signal 178 has a second volume V2 and corresponds with audio playback 174. It should be appreciated that first audio signal 110 can be produced during first time interval 166, second time interval 172, and/or third time interval 176. In other words, first audio signal 110 corresponding with first audio stream 168 can be continuous. Additionally, it should be appreciated that during third time interval 176, first audio signal 110 corresponding with first audio stream 168 can be paused while first speaker 106 produces second audio signal 178 corresponding with audio playback 174. Alternatively, during third time interval 176, first volume V1 of first audio signal 110 and second volume V2 of second audio signal 178 can be altered so that the user can differentiate between the signals while they are simultaneously produced by first speaker 106. For example, first volume V1 of first audio signal 110 could be decreased or second volume V2 of second audio signal 178 could be increased during third time interval 176 so that each audio signal can be audibly differentiated.

As illustrated in FIG. 5B, in one example, first protocol 158 (which in this example, may be Bluetooth classic), may utilize an audio-oriented channel 180 and a data-oriented channel 182. Audio-oriented channel 180 and data-oriented channel 180 are each intended to be associated with one channel of a plurality of channels with operating ranges between 2400-2483.5 MHz, where each channel is separated by, e.g., 2 MHz within that range. Furthermore, it should be appreciated that audio-oriented channel 180 and data-oriented channel 182 can be separate channels of a plurality of Connection-Oriented Channels (CoC) of a Bluetooth Low-Energy (BLE) protocol. Similar to the examples described above, during a first time interval, i.e., first time interval 166, first wearable audio device 102 and first device 104 are arranged to establish first connection 154 using first protocol 158. Audio-oriented channel 180 of first protocol 158 is arranged to carry or transmit data related to a first audio stream, i.e., first audio stream 168. First audio stream 168 can be audio information related to a digital music file or any other audio file saved in first memory 116, second memory 148, the memory of another external device, or a memory accessible via a network connection (e.g., cloud-based connection). First wearable audio device is arranged to produce first audio signal 110 (not shown) corresponding with first audio stream 168 via first speaker 106. It should be appreciated that audio-oriented channel 180 and data-oriented channel 182 can utilize any of the protocols discussed above along with any conceivable combination of profiles or channels discussed above. Additionally, and during first time interval 166, data-oriented channel 182 of first protocol 158 is arranged to carry or transmit data related to first voice input 122 received from either first microphone 120 or second microphone 152 while in active state 124 as discussed above. First communication module 108 is arranged to compress and/or encode first voice input 122 so that it can be sent received over data-oriented channel 182 of first protocol 158. Optionally, in addition to compressing and/or encoding first voice input 122, first communication module 108 is arranged to execute an audio filter program, i.e., filter 160, on first voice input 122, where filter 160 (which may comprise one or more filters) is arranged to remove any background audio or background noise unintentionally received by first microphone 106 while receiving first voice input 122. Second communication module 138 is arranged to receive, via data-oriented channel 182 of first protocol 158, the compressed and/or encoded first voice input 122 and decompress and/or decode first voice input 122. Once decompressed and/or decoded by second communication module 138, first voice input 122 can be utilized by a third-party program, e.g., third-party program 170. Third-party program 170 (shown in FIG. 4B) is intended to be a program executable on first device 104, which can utilize first voice input 122, e.g., a Virtual Personal Assistant (VPA) programs (e.g., Amazon Alexa, Google Assistant, Apple Siri) known in the art.

During a second time interval, i.e., second time interval 172 (not illustrated) after first time interval 166, third-party program 170 (shown in FIG. 4B) is arranged to receive first voice input 122 and, e.g., generate an audio playback response corresponding or relating to first voice input 122, i.e., audio playback 174. During a third time interval 176, after second time interval 172, audio playback 174 is transmitted, via data-oriented channel 182, from first device 104 to first wearable device 104, where first speaker 106 is arranged to produce a second audio signal, i.e., second audio signal 178, where second audio signal 178 has a second volume V2 and corresponds with audio playback 174. It should be appreciated that first audio signal 110 can be produced during first time interval 166, second time interval 172, and/or third time interval 176. In other words, first audio signal 110 corresponding with first audio stream 168 can be continuous. Additionally, it should be appreciated that during third time interval 176, first audio signal 110 corresponding with first audio stream 168 can be paused while first speaker 106 produces second audio signal 178 corresponding with audio playback 174. Alternatively, during third time interval 176, first volume V1 of first audio signal 110 and second volume V2 of second audio signal 178 can be altered so that the user can differentiate between the signals while they are simultaneously produced by first speaker 106. For example, first volume V1 of first audio signal 110 could be decreased or second volume V2 of second audio signal 178 could be increased during third time interval 176 so that each audio signal can be audibly differentiated.

As illustrated in FIG. 5C, in one example, two simultaneous connections are utilized to send and receive the audio and voice data in the alternative to using audio-oriented profiles and/or channels and data-oriented profiles and/or channels. In this example, first connection 154 and second connection 156 are established between first wearable audio device 102 and first device 104. It should be appreciated that both first connection 154 can be high throughput connections (e.g., 1-2 Mbps). First connection 154 is established via first protocol 158, while second connection 156 is established via second protocol 184. First protocol 158 and second protocol 184 can be selected from: a Bluetooth Classic protocol, a Bluetooth Low-Energy (BLE) protocol, a ZigBee protocol, a Wi-Fi (IEEE 802.11) protocol, Near-field Magnetic Induction (NFMI), Near-Field Electromagnetic Induction (NFEMI), or any other protocol for establishing a wireless connection between first wearable audio device 102 and first device 104. In one example, the first connection 154 is established via Bluetooth classic and the second connection 156 is established via BLE. It should also be appreciated that first protocol 158 and second protocol 184 can utilize any of the following Bluetooth Profiles: Advanced Audio Distribution Profile (A2DP), Attribute Profile (ATT), Audio/Video Remote Control Profile (AVRCP), Basic Imaging Profile (BIP), Basic Printing Profile (BPP), Common ISDN Access Profile (CIP), Cordless Telephony Profile (CTP), Device ID Profile (DIP), Dial-up Networking Profile (DUN), Fax Profile (FAX), File Transfer Profile (FTP), Generic Audio/Video Distribution Profile (GAVDP), Generic Access Profile (GAP), Generic Attribute Profile (GATT), Generic Object Exchange Profile (GOEP), Hard Copy Cable Replacement Profile (HCRP), Health Device Profile (HDP), Hands-Free Profile (HFP), Human Interface Device Profile (HID), Headset Profile (HSP), Intercom Profile (ICP), LAN Access Profile (LAP), Mesh Profile (MESH), Message Access Profile (MAP), OBject EXchange (OBEX), Object Push Profile (OPP), Personal Area Networking Profile (PAN), Phone Book Access Profile (PBAP, PBA), Proximity Profile (PXP), Serial Port Profile (SPP), Service Discovery Application Profile (SDAP), SIM Access Profile (SAP, SIM, rSAP), Synchronization Profile (SYNCH), Synchronization Mark-up Language Profile (SyncML), Video Distribution Profile (VDP), Wireless Application Protocol Bearer (WAPB), iAP (similar to SPP but only compatible with iOS), or any suitable Bluetooth Classic profile or Bluetooth Low-Energy profile. Furthermore, it should be appreciated that first protocol 158 and second protocol 184 can utilize any of the following Bluetooth/BLE channels or can be separate channels of a plurality of Connection-Oriented Channels (CoC) of a Bluetooth classic or Bluetooth Low-Energy (BLE) protocol.

In this example, first connection 154 is a high throughput connection, i.e., capable of transmitting larger amounts of data (e.g., 1-2 Mbps) while second connection 156 is a low throughput connection, i.e., transmits data at less than 1 Mbps. In this example, first protocol 158 of first connection 154 is Bluetooth Classic utilizing the Advanced Audio Distribution Profile (A2DP), while second protocol 184 of second connection 156 is Bluetooth Low-Energy (BLE) utilizing at least one channel of a plurality of Connection-Oriented Channels (CoC). During a first time interval, i.e., first time interval 166, first wearable audio device 102 and first device 104 are arranged to establish first connection 154 using first protocol 158 and second connection 156 via second protocol 184. First protocol 158 is arranged to carry or transmit data related to a first audio stream, i.e., first audio stream 168. First audio stream 168 can be audio information related to a digital music file or any other audio file saved in first memory 116, second memory 148, the memory of another external device, or a memory accessible via a network connection (e.g., cloud-based connection). First wearable audio device is arranged to produce first audio signal 110 corresponding with first audio stream 168 via first speaker 106. Additionally, and during first time interval 166, second protocol 184 is arranged to carry or transmit data related to first voice input 122 received from either first microphone 120 or second microphone 152 while in active state 124 as discussed above. First communication module 108 is arranged to compress and/or encode first voice input 122 so that it can be sent received over second protocol 184. Optionally, in addition to compressing and/or encoding first voice input 122, first communication module 108 is arranged to execute an audio filter program, i.e., filter 160, on first voice input 122, where filter 160 (which may comprise one or more filters) is arranged to remove any background audio or background noise unintentionally received by first microphone 106 while receiving first voice input 122. Second communication module 138 is arranged to receive, via second protocol 184, the compressed and/or encoded first voice input 122 and decompress and/or decode first voice input 122. Once decompressed and/or decoded by second communication module 138, first voice input 122 can be utilized by a third-party program, e.g., third-party program 170 (shown in FIG. 4B). Third-party program 170 is intended to be a program executable on first device 104, which can utilize first voice input 122, e.g., a Virtual Personal Assistant (VPA) programs (e.g., Amazon Alexa, Google Assistant, Apple Siri) known in the art.

During a second time interval, i.e., second time interval 172 (not illustrated) after first time interval 166, third-party program 170 is arranged to receive first voice input 122 and, e.g., generate an audio playback response corresponding or relating to first voice input 122, i.e., audio playback 174. During a third time interval 176, after second time interval 172, audio playback 174 is transmitted, via second protocol 184, from first device 104 to first wearable device 104, where first speaker 106 is arranged to produce a second audio signal, i.e., second audio signal 178, where second audio signal 178 has a second volume V2 and corresponds with audio playback 174. It should be appreciated that first audio signal 110 can be produced during first time interval 166, second time interval 172, and/or third time interval 176. In other words, first audio signal 110 corresponding with first audio stream 168 can be continuous. Additionally, it should be appreciated that during third time interval 176, first audio signal 110 corresponding with first audio stream 168 can be paused while first speaker 106 produces second audio signal 178 corresponding with audio playback 174. Alternatively, during third time interval 176, first volume V1 of first audio signal 110 and second volume V2 of second audio signal 178 can be altered so that the user can differentiate between the signals while they are simultaneously produced by first speaker 106. For example, first volume V1 of first audio signal 110 could be decreased or second volume V2 of second audio signal 178 could be increased during third time interval 176 so that each audio signal can be audibly differentiated.

Figure 6:
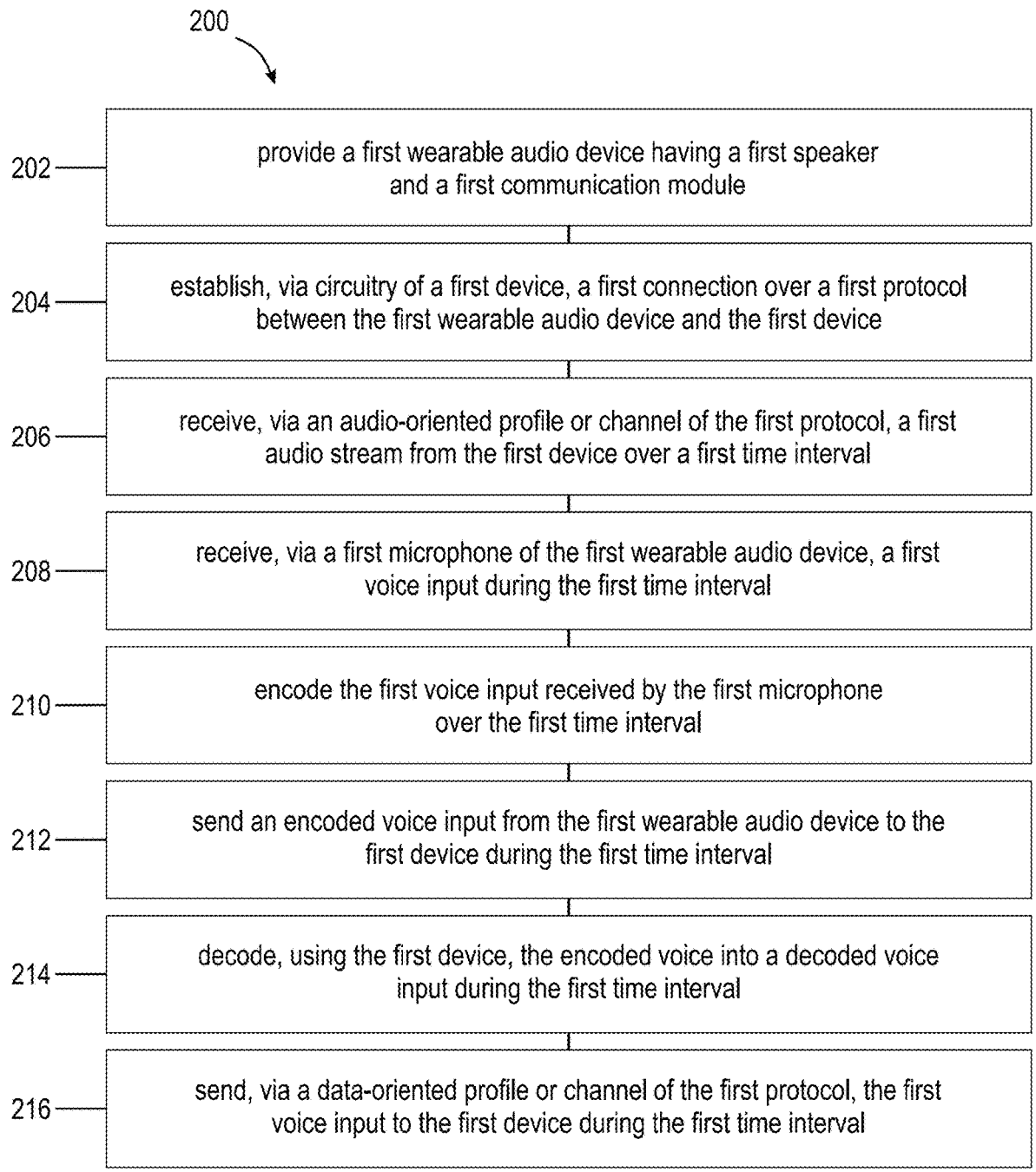
FIG. 6 is a flow chart illustrating steps of a method according to the present disclosure.

FIG. 6 illustrates the steps of method 200 according to the present disclosure. Method 200 includes, for example: providing a first wearable audio device 102 having a first speaker 106 and a first communication module 108 (step 202); establishing, via circuitry 136 of a first device 104, a first connection 154 over a first protocol 158 between the first wearable audio device 102 and the first device 104 (step 204); receiving, via an audio-oriented profile 162 or channel 180 of the first protocol, a first audio stream 168 from the first device 104 over a first time interval 166 (step 206); receiving, via a first microphone 120 of the first wearable audio device 102, a first voice input 122 during the first time interval 166 (step 208); encoding the first voice input 122 received by the first microphone 120 over the first time interval 166 (step 210); sending an encoded voice input from the first wearable audio device 102 to the first device 104 during the first time interval 166 (step 212) via a data-oriented profile 164 or channel 182 of the first protocol 158; decoding, using the first device 104, the encoded voice into a decoded voice input during the first time interval 166 (step 214); and sending, via a data-oriented profile 164 or channel 182 of the first protocol 158, the first voice input 122 to the first device 104 during the first time interval 166 (step 216).

Figure 7:
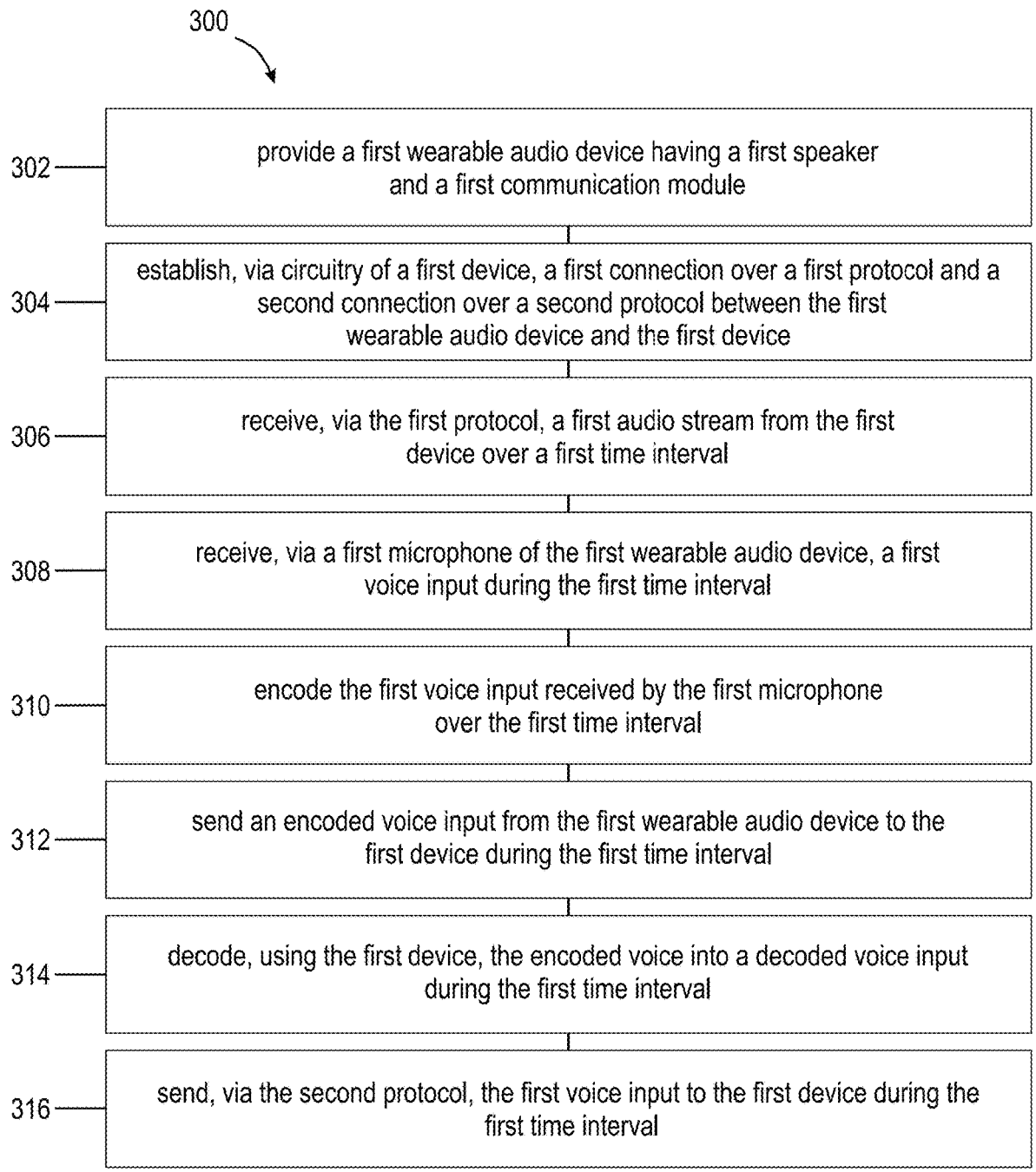
FIG. 7 is a flow chart illustrating steps of a method according to the present disclosure.

FIG. 7 illustrates the steps of method 300 according to the present disclosure. Method 300 includes, for example: providing a first wearable audio device 102 having a first speaker 106 and a first communication module 108 (step 302); establishing, via circuitry 136 of a first device 104, a first connection 154 over a first protocol 158 and a second connection 156 over a second protocol 184 between the first wearable audio device 102 and the first device 104 (step 304); receiving, via the first protocol 158, a first audio stream 168 from the first device 104 over a first time interval 166 (step 306); receiving, via a first microphone 120 of the first wearable audio device 102, a first voice input 122 during the first time interval 166 (step 308); encoding the first voice input 122 received by the first microphone 120 over the first time interval 166 (step 310); sending an encoded voice input from the first wearable audio device 102 to the first device 104 during the first time interval 166 (step 312) via the second protocol 184; decoding, using the first device 104, the encoded voice into a decoded voice input during the first time interval 166 (step 314); and sending, via the second protocol 184, the first voice input 122 to the first device 104 during the first time interval 166 (step 316).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for streaming audio and voice data, the method comprising:
   providing a first wearable audio device having a first speaker and a first communication module;
   establishing, via circuitry of a first device, a first connection over a first protocol between the first wearable audio device and the first device;
   receiving, via an audio-oriented profile or channel of the first protocol, a first audio stream from the first device over a first time interval;
   receiving, via a first microphone of the first wearable audio device, a first voice input during the first time interval; and,
   sending, via a data-oriented profile or channel of the first protocol, the first voice input to the first device during the first time interval, wherein the first voice input is utilized by a Virtual Private Assistant (VPA) running on the first device during a second time interval after the first time interval and wherein the VPA provides an audio playback during a third time interval after the second time interval.

2. The method of claim 1, wherein the audio-oriented profile or channel comprises a high-throughput connection.

3. The method of claim 1, wherein the data-oriented profile or channel comprises a high throughput connection.

4. The method of claim 1, wherein the audio-oriented profile or channel comprises the Advanced Audio Distribution Profile (A2DP) of Bluetooth Classic or Bluetooth Low-Energy (BLE).

5. The method of claim 1, wherein the first protocol comprises Bluetooth Classic or Bluetooth Low-Energy (BLE).

6. The method of claim 1, wherein the sending the first voice input to the first device comprises:
   encoding the first voice input received by the first microphone over the first time interval;
   sending an encoded voice input from the first wearable audio device to the first device during the first time interval; and,
   decoding, using the first device, the encoded voice into a decoded voice input during the first time interval.

7. The method of claim 1, wherein the first audio stream is received, and a first audio signal is produced by the first speaker during the first time interval, the second time interval, and the third time interval.

8. A method for streaming audio and voice data, the method comprising:
   providing a first wearable audio device having a first speaker and a first communication module;
   establishing, via circuitry of a first device, a first connection over a first protocol and a second connection over a second protocol between the first wearable audio device and the first device;
   receiving, via the first protocol, a first audio stream from the first device over a first time interval;
   receiving, via a first microphone of the first wearable audio device, a first voice input during the first time interval; and,
   sending, via the second protocol, the first voice input to the first device during the first time interval, wherein the sending the first voice input to the first device comprises:
   encoding the first voice input received by the first microphone over the first time interval;
   sending an encoded voice input from the first wearable audio device to the first device during the first time interval; and,
   decoding, using the first device, the encoded voice into a decoded voice input during the first time interval and wherein the decoded voice input is utilized by a third-party program running on the first device during a second time interval after the first time interval and wherein the third-party program provides an audio playback during a third time interval after the second time interval wherein the third-party program is a Virtual Private Assistant (VPA).

9. The method of claim 8, wherein the first protocol comprises Bluetooth Classic or Bluetooth Low-Energy (BLE).

10. The method of claim 9, wherein the first audio stream is received over the Advanced Audio Distribution Profile (A2DP) of Bluetooth Classic or a profile or channel of Bluetooth Low-Energy (BLE).

11. The method of claim 8, wherein the second protocol comprises Bluetooth Low-Energy (BLE) or Bluetooth Classic.

12. The method of claim 11, wherein the first voice input is sent over at least one of: Serial Port Profile (SPP), iPod Accessory Protocol (iAP), Radio Frequency Communication (RFCOMM), a connection-oriented channel (CoC), Bluetooth Generic Attribute Profile (GATT), and Logical Link Control and Adaptation Protocol (L2CAP).

13. The method of claim 8, wherein the first audio stream is received, and a first audio signal is produced by the first speaker during the first time interval, the second time interval, and the third time interval.

14. An audio system comprising:
   a first wearable audio device comprising:
   a first speaker; and,
   a first communication module arranged to establish a first connection with a first device via a first protocol;
   wherein the first wearable audio device is arranged to:
   receive, over an audio-oriented profile or channel of the first protocol, a first audio stream from the first device over a first time interval;

receive, via a first microphone of the first wearable audio device or the first device, a first voice input during the first time interval; and, send, over a data-oriented profile or channel of the first protocol, the first voice input during the first time interval wherein the first speaker is configured to produce a first audio signal associated with the audio-oriented profile or channel and the first speaker is configured to produce a second audio signal associated with the data-oriented profile or channel, and wherein the first audio signal has a first volume and the second audio signal has a second volume wherein the first volume may be increased or decreased to differentiate the first audio signal from the second audio signal.

15. The system of claim 14, wherein the sending the first voice input to the first device comprises:

encoding the first voice input received by the first microphone over the first time interval;

sending an encoded voice input from the first wearable audio device to the first device during the first time interval; and, decoding, using the first device, the encoded voice into a decoded voice input during the first time interval.

16. The system of claim 14, wherein the decoded voice input is utilized by a third-party program running on the first device during a second time interval after the first time interval, and wherein the third-party program provides an audio playback during a third time interval after the second time interval.

17. The system of claim 16, wherein the first audio stream is received, and a first audio signal associated with the first audio stream is produced by the first speaker during the first time interval, the second time interval, and the third time interval.

18. An audio system comprising:
a first wearable audio device comprising:
a first speaker; and,
a first communication module arranged to establish a first connection with a first device via a first protocol and a second connection with the first device via a second protocol;
wherein the first wearable audio device is arranged to:
receive, over the first protocol, a first audio stream from the first device over a first time interval;
receive, via a first microphone of the first wearable audio device or the first device, a first voice input during the first time interval; and,
send, over a second protocol, the first voice input during the first time interval, wherein the first voice input is utilized by a Virtual Private Assistant (VPA) running on the first device during a second time interval after the first time interval and wherein the VPA provides an audio playback during a third time interval after the second time interval.

19. The system of claim 18, wherein the sending the first voice input to the first device comprises:

encoding the first voice input received by the first microphone over the first time interval;

sending an encoded voice input from the first wearable audio device to the first device during the first time interval; and, decoding, using the first device, the encoded voice into a decoded voice input during the first time interval.

20. The system of claim 18, wherein the first audio stream is received, and a first audio signal associated with the first audio stream is produced by the first speaker during the first time interval, the second time interval, and the third time interval.

* * * * *